United States Patent
Navratil et al.

(10) Patent No.: US 9,578,634 B2
(45) Date of Patent: Feb. 21, 2017

(54) METHOD AND APPARATUS FOR REDUCING POWER CONSUMPTION DURING DATA TRANSFER

(75) Inventors: David Navratil, Helsinki (FI); Guillaume Sébire, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 927 days.

(21) Appl. No.: 12/704,109

(22) Filed: Feb. 11, 2010

(65) Prior Publication Data

US 2010/0210275 A1  Aug. 19, 2010

Related U.S. Application Data

(60) Provisional application No. 61/151,692, filed on Feb. 11, 2009.

(51) Int. Cl.
*H04W 72/04* (2009.01)
*H04W 52/02* (2009.01)

(52) U.S. Cl.
CPC ....... *H04W 72/042* (2013.01); *H04W 52/0229* (2013.01); *Y02B 60/50* (2013.01)

(58) Field of Classification Search
None
See application file for complete search history.

(56) References Cited

U.S. PATENT DOCUMENTS 5,748,624 A * 5/1998 Kondo ................... 370/347
2002/0160812 A1* 10/2002 Moshiri-Tafreshi et al. . 455/561
2003/0142657 A1* 7/2003 Forssell ................... 370/347
2005/0105503 A1* 5/2005 Cayla et al. ............. 370/346
2006/0183443 A1* 8/2006 Chang et al. ............ 455/121
2007/0047503 A1* 3/2007 Gonorovsky et al. ...... 370/337

FOREIGN PATENT DOCUMENTS

| CN | 102450061 B | 8/2015 |
| WO | 2008/024890 A2 | 2/2008 |
| WO | 2010/092545 A1 | 8/2010 |

OTHER PUBLICATIONS

3GPP TS 44.060 V8.3.0, Dec. 2008, Release 8, pp. 1-574.*
Motorola, "Power consumption issue with delayed TBF", 3GPP TSG-GERAN Meeting #08, Agenda 6.6, Tdoc GP-020114, Feb. 4-8, 2002, pp. 1-5.*
3GPP TSG GERAN #3, GP-010206, Agenda Item 7.2.5.4, "Delayed TBF Release—Concept", Jan. 15-19, 2001.*

(Continued)

*Primary Examiner* — Huy D Vu
*Assistant Examiner* — James P Duffy
(74) *Attorney, Agent, or Firm* — Ditthavong & Steiner, P.C.

(57) ABSTRACT

An approach for reducing power consumption during data transfer is provided. A period of delayed release of one or more radio resources associated with a data flow is detected. In response to the detection, radio resource reduction information is generated for a data transfer during the period, wherein the radio resource reduction information specifies a reduced allocation of one or more radio resources. Control information is generated for transmission to a mobile station, wherein the control information specifies the radio resource reduction information.

17 Claims, 12 Drawing Sheets

(56) References Cited

OTHER PUBLICATIONS

Office Action for corresponding Chinese Application No. 201080007381.6, dated Jan. 26, 2014, 39 pages (English Summary of Office Action included).
Chinese Office Action for related Chinese Patent Application No. 201080007381.6 dated Jan. 15, 2015, with English-language summary, 14 pages.
Office Action for corresponding Indonesian Application No. HKI-3-HI.05.02.01.3374, dated Jun. 18, 2014, 6 pages.
Nokia, "Delayed TBF Release—Concept", 3GPP TSG GERAN #3, GP-010206, Agenda Item 7.2.5.4, Jan. 15-19, 2001, pp. 1-5.
Ericsson, "Aspects on RLC/MAC performance improvement", 3GPP TSG GERAN WG2 Ad Hoc on TBF, Document GAHT-010009, Feb. 15-16, 2001, pp. 1-6.
Office Action for corresponding European Patent Application No. 10740995.5-1854, dated Nov. 9, 2015, 12 pages.
Office Action corresponding to Vietnamese Patent Application No. 1-2011-02078 dated May 27, 2015, 2 pages.
Office Action for corresponding Vietnamese Patent Application No. 1-2011-02078, dated Oct. 7, 2016, 4 pages.

* cited by examiner

FIG. 5B

BSN = BLOCK SEQUENCE NUMBER
SNS = SEQUENCE NUMBER SPACE
FBI = FINAL BLOCK INDICATOR
E = EXTENSION BIT

RLC BLOCK WITH BSN=N (MOD SNS)

| BIT 8 | 7 | 6 | 5 | 4 | 3 | 2 | 1 | |
|---|---|---|---|---|---|---|---|---|
| | | | | | | FBI=0 | E=0 | OCTET 1 |
| LENGTH INDICATOR = 0 | | | | | | | E=0 | OCTET 2 |
| LENGTH INDICATOR = 126 | | | | | | | E=0 | OCTET 3 |
| LENGTH INDICATOR = 127 | | | | | | | E=1 | OCTET 4 |
| RADIO RESOURCE (E.G., TIMESLOT) REDUCTION INFORMATION (CARRIER 1) | | | | | | | | OCTET 5 |
| RADIO RESOURCE (E.G., TIMESLOT) REDUCTION INFORMATION (CARRIER 2) | | | | | | | | OCTET 6 |
| FILLING OCTETS | | | | | | | | OCTET 12 ... OCTET N2 |

503

METHOD AND APPARATUS FOR REDUCING POWER CONSUMPTION DURING DATA TRANSFER

RELATED APPLICATIONS

This application claims the benefit of the earlier filing date under 35 U.S.C. §119(e) of U.S. Provisional Application Ser. No. 61/151,692 filed Feb. 11, 2009, entitled "Method and Apparatus for Reducing Power Consumption During Data Transfer," the entirety of which is incorporated herein by reference.

BACKGROUND

Radio communication systems, such as a wireless data network (e.g., Global System for Mobile communications (GSM)/Enhanced Data Rates for GSM Evolution (EDGE) radio access network (GERAN)), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves reducing the power consumption of the data transfers associated with many of the services and features. The functionalities demanded of wireless devices are often at odds with the design of the power system of the devices, in that generally more functions require more power consumption. Therefore, there is a need for more approaches for energy efficient use of radio resources.

SOME EXAMPLE EMBODIMENTS

According to certain exemplary embodiment, an approach provides for reducing power consumption during a data transfer by dynamically reducing the use of radio resources when there are gaps in the data stream of a data connection.

According to one embodiment, a method comprises detecting a period of delayed release of one or more radio resources associated with a data flow. The method also comprises generating, in response to the detection, radio resource reduction information for the data flow during the period, wherein the radio resource reduction information specifies a reduced allocation of the one or more radio resources. The method further comprises generating control information for transmission to a mobile station, wherein the control information specifies the radio resource reduction information.

According to another embodiment, an apparatus comprises at least one processor, and at least one memory including computer program code. The at least one memory and the computer program code configured to, with the at least one processor, cause the apparatus to perform at least the following: detect a period of delayed release of one or more radio resources associated with a data flow. The apparatus is also caused to generate, in response to the detection, radio resource reduction information for the data flow during the period, wherein the radio resource reduction information specifies a reduced allocation of the one or more radio resources. The apparatus is further caused to generate control information for transmission to a mobile station, wherein the control information specifies the radio resource reduction information.

According to another embodiment, a method comprises receiving a power saving command specifying radio resource reduction information that specifies a reduced allocation of one or more radio resources. The method also comprises monitoring one or more communication channels corresponding to the reduced allocation of the one or more radio resources for use in transfer of data during a period of delayed release of one or more radio resources associated with a data flow.

According to another embodiment, an apparatus comprises at least one processor, and at least one memory including computer program code. The at least one memory and the computer program code configured to, with the at least one processor, cause the apparatus to perform at least the following: receive a power saving command specifying radio resource reduction information that specifies a reduced allocation of one or more radio resources. The apparatus is also caused to monitor one or more communication channels corresponding to the reduced allocation of the one or more radio resources for use in transfer of data during a period of delayed release of one or more radio resources associated with a data flow.

According to another embodiment, an apparatus comprises means for detecting a period of delayed release of one or more radio resources associated with a data flow. The apparatus also comprises means for means for generating, in response to the detection, radio resource reduction information for the data flow during the period, wherein the radio resource reduction information specifies a reduced allocation of the one or more radio resources. The apparatus further comprises means for generating control information for transmission to a mobile station, wherein the control information specifies the radio resource reduction information.

According to yet another embodiment, an apparatus comprises means for receiving a power saving command specifying radio resource reduction information that specifies a reduced allocation of one or more radio resources. The apparatus also comprises means for monitoring one or more communication channels corresponding to the reduced allocation of the one or more radio resources for use in transfer of data during a period of delayed release of one or more radio resources associated with a data flow.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5C are diagrams of radio link control (RLC) data blocks for signaling radio resource reduction information on a downlink temporary block flow (TBF), according to various exemplary embodiments;

DESCRIPTION OF SOME EMBODIMENTS

An apparatus, method, and software for reducing power consumption during a data transfer are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Global System for Mobile communications (GSM)/Enhanced Data Rates for GSM Evolution (EDGE) radio access network (GERAN) architecture, it is recognized by one of ordinary skill in the art that the embodiments of the inventions have applicability to any type of communication system and equivalent functional capabilities.

Figure 1:
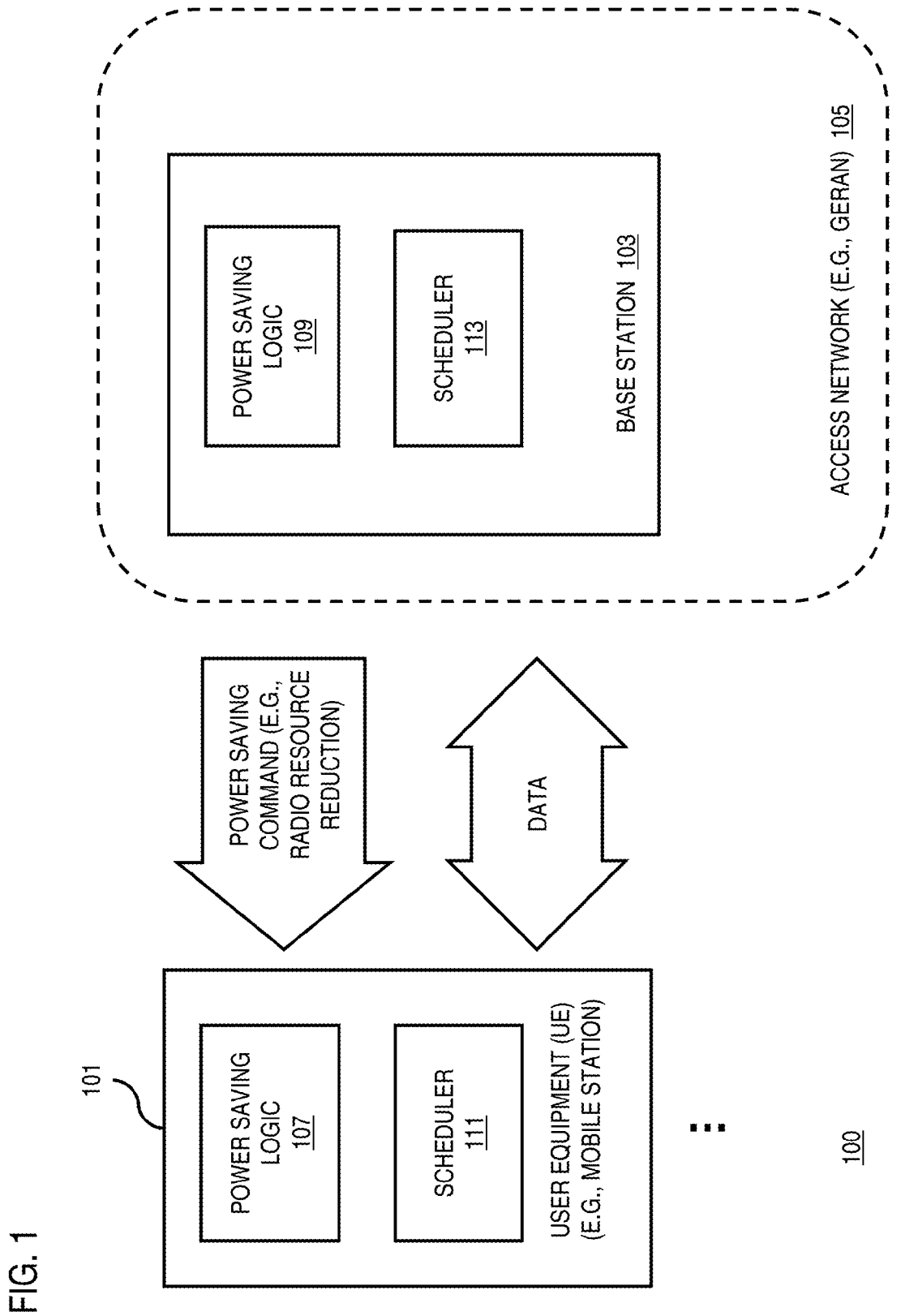
FIG. 1 is a diagram of a communication system capable of reducing power consumption during a data transfer, according to an exemplary embodiment.

FIG. 1 is a diagram of a communication system capable of reducing power consumption during a data transfer, according to an exemplary embodiment. As shown in FIG. 1, a communication system 100 includes one or more mobile stations (MSs) 101 communicating with a base station 103, which is part of an access network 105 (e.g., GERAN). The MSs 101 can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). To achieve power savings, power saving logic 107, 109 can be deployed within the mobile station 101 and base station 103, respectively, according to certain embodiments. As will be more fully detailed below, such power saving logic 107, 109 operate in conjunction with schedulers 111, 113 to efficient transfer data, while minimizing use of system resources at the MS 101 (e.g., power can be reduced). Further, the MS 101 includes a transceiver (not shown) and an antenna system (not shown) that couples to the transceiver to receive or transmit signals from the base station 103. The antenna system can include one or more antennas. As with the MS 101, the base station 103 employs a transceiver, which transmits information to the MS 101. Also, the base station 103 can employ one or more antennas for transmitting and receiving electromagnetic signals.

Typically, the base station 103 and MS 101 regularly exchange control information. Such control information, in an exemplary embodiment, is transported over a control channel on, for example, the downlink from the base station 103 to the MS 101. By way of example, a number of communication channels are defined for use in the system of FIG. 1. The channel types include: physical channels, and logical channels. For example, in GERAN, the packet data channel (PDCH) is a physical channel on which the logical channels such as the packet data traffic channel (PDTCH) and the packet associated control channel (PACCH) are mapped.

To ensure accurate delivery of information between the base station 103 and the MS 101, the system of FIG. 1 utilizes error detection in exchanging information, e.g., Hybrid ARQ (HARQ). HARQ is a concatenation of Forward Error Correction (FEC) coding and an Automatic Repeat Request (ARQ) protocol. Automatic Repeat Request (ARQ) is an error recovery mechanism used on the link layer. As such, this error recovery scheme is used in conjunction with error detection schemes (e.g., CRC (cyclic redundancy check)), and is handled with the assistance of error detection modules and within the base station 103 and MS 101, respectively. The HARQ mechanism permits the receiver (e.g., MS 101) to indicate to the transmitter (e.g., base station 103) that a packet or sub-packet has been received incorrectly, and thus, requests the transmitter to resend the particular packet(s).

In GERAN, a temporary block flow (TBF) is a logical connection between a MS 101 and a base station 103 that enables the unidirectional transfer of data and other signaling information over, for instance, a network cell. (See "Digital cellular telecommunications system (Phase 2+); General Packet Radio Service (GPRS); Mobile Station (MS)—Base Station System (BSS) interface; Radio Link Control/Medium Access Control (RLC/MAC) protocol," 3GPP TS 44.060, ver. 8.3.0, Release 8, incorporated herein by reference in its entirety). A TBF used for the exchange of data in the direction from the base station 103 to the MS 101 is a downlink TBF. A TBF used for the exchange of data in the direction from the MS 101 to the base station 103 is an uplink TBF. The exchange of data between the MS 101 and the base station 103 in a given direction requires the exchange of control information between the MS 101 and the base station 103 in both directions. For example, a data transfer on a downlink TBF may require acknowledgement/negative acknowledgement (ACK/NACK) information in the uplink. Typically, a TBF is temporary and exists only for the duration of the data transfer (e.g., a TBF ends when all data blocks have been successfully transmitted).

Nevertheless, the release of radio resources associated with a data flow, such as the TBF, can be delayed on either the downlink (i.e., delayed release of downlink TBF mode) or the uplink (i.e., extended uplink TBF mode) beyond the duration of a data transfer if, for instance, additional data are expected to be transmitted within the near future, thus avoiding wasting time and radio resources to release and re-establish the TBF. For example, a delayed release of a downlink TBF may be used during a web browsing session when the corresponding web server is busy and cannot immediately respond. If the TBF were allowed to time out before the web server can provide the requested information, the web request would have to be reinitiated. Depending on the network load and other conditions, repeated timing out of data requests may result in degraded service to the end user. Therefore, it can be beneficial to maintain the TBF longer and avoid TBF release and establishment before a new request is transmitted to the network.

However, repeated or extended delays of a TBF release can greatly increase power consumption because both the MS 101 and the base station 103 continue to actively monitor the assigned radio resources (e.g., radio transmission timeslots) even when no data are being transmitted. It is noted that the problem of power consumption during a delayed release of the downlink TBF is worsened with the introduction of dual-carrier operation in which two simultaneous radio frequencies are used for a specific TBF. Under this scenario, the MS 101 and the base station 103 consume power monitoring the two frequencies at the same time.

To address this problem, the approach described herein reduces the radio resources used during a period of delayed release of the TBF (e.g., delayed downlink TBF release mode or extended uplink TBF mode) by, for example, reducing the number of transmission timeslots that are monitored. The approach also provides for fast resumption of normal operation (e.g., resumption of data transfer on all assigned timeslots) from the power saving mode (i.e., reduced radio resources mode). It is contemplated that the base station 103 or other network component decides the amount of radio resource reduction to use during the period of delayed TBF release (e.g., the reduction in the number of timeslots to monitor). Power saving logic 107, 109 is included within the MS 101 and the base station 103 to implement the approach. It is also noted that, in exemplary embodiments, the reduction of radio resources is relative to the originally assigned resources and may be performed dynamically during the data gap. For example, the base station 103 originally assigns radio resources that include four transmission timeslots to the mobile station 101. During a data gap, the base station 103 may reduce the resources to one timeslot. During the same data gap, the base station 103 may increase the resources to two timeslots. The increase to two timeslots nonetheless represents an overall reduction relative to the original allocation of four time slots.

Figure 2:
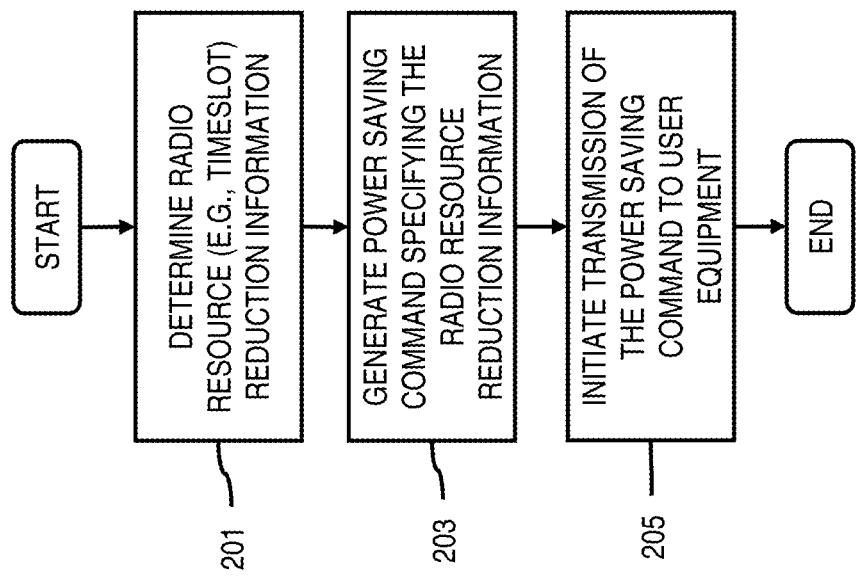
FIG. 2 is a flowchart of a process for reducing power consumption during a data transfer, according to an exemplary embodiment.

FIG. 2 is a flowchart of a process for reducing power consumption during a data transfer, according to an exemplary embodiment. In this example, it is assumed that the process involves a period of delayed release of one or more radio resources associated with a data flow (e.g., temporary block flow), whereby reduced resource allocation can be employed. As shown, in step 201, the base station 103 determines information specifying a radio resource reduction (e.g., reduction in the number of timeslots to monitor). Next, the process generates a control information specifying the radio resource reduction information, and initiates transmission of the control information (e.g., power saving command) to the MS 101, as in step 203. The radio resource reduction information, for example, describes on which timeslot(s) the MS 101 should expect future occurrences of downlink data or an uplink resource allocation (e.g., an uplink state flag (USF)). In step 205, the process initiates transmission of the power saving command to the mobile station 101. The MS 101 then monitors only the specified channels until the MS 101 resumes normal operation—that is, use of the full radio resources (e.g., timeslots).

Figure 3:
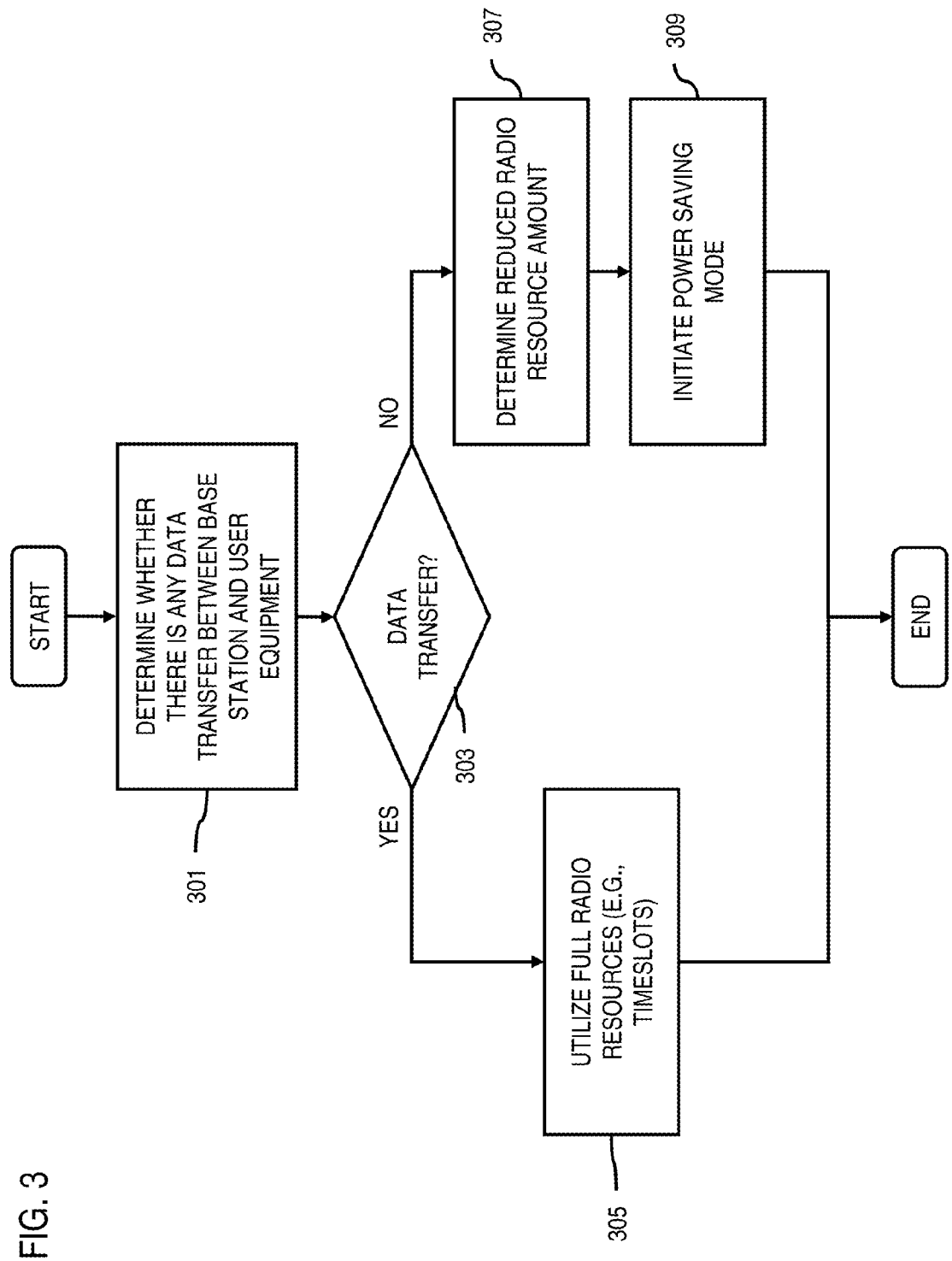
FIG. 3 is a flowchart of a process for determining radio resource reduction information, according to an exemplary embodiment.

FIG. 3 is a flowchart of a process for determining radio resource reduction information, according to an exemplary embodiment. As shown, the base station 103 determines, per step 301, whether there is an active data transfer occurring over a TBF between the base station 103 and the MS 101.

The process determines whether there is an active data transfer, as in step 303. If there is an active data transfer, the base station 103 and the MS 101 use all of radio resources (e.g., timeslots) assigned for the purpose (step 305). If there is no active data transfer, the base determines an amount of reduced radio resources (e.g., timeslots) for use during the period of inactivity over the TBF, initiates the power saving mode (i.e., use fewer radio resources) at the base station 103, and initiates signaling of the MS 101 to enter a corresponding power saving mode (steps 307 and 309).

By way of example, the base station 103 signals to the MS 101 the radio resource reduction (e.g., timeslot reduction) information in the payload of a radio link control (RLC) data block for the downlink TBF. For instance, the radio reduction information is appended to the last logical link control (LLC) protocol data unit (PDU). In one embodiment, the radio resource reduction information is signaled as a bitmap (e.g., a "radio resource reduction bitmap").

For the uplink TBF, the base station 103 may, for instance, deliver the radio resource reduction information in the content of a packet uplink acknowledgement/negative acknowledgement (PUAN) message. The radio resource reduction information corresponding to the uplink TBF indicates to the MS 101 the base station's intention to not transmit resource allocations (e.g., USF values) associated with the uplink TBF.

Figure 4:
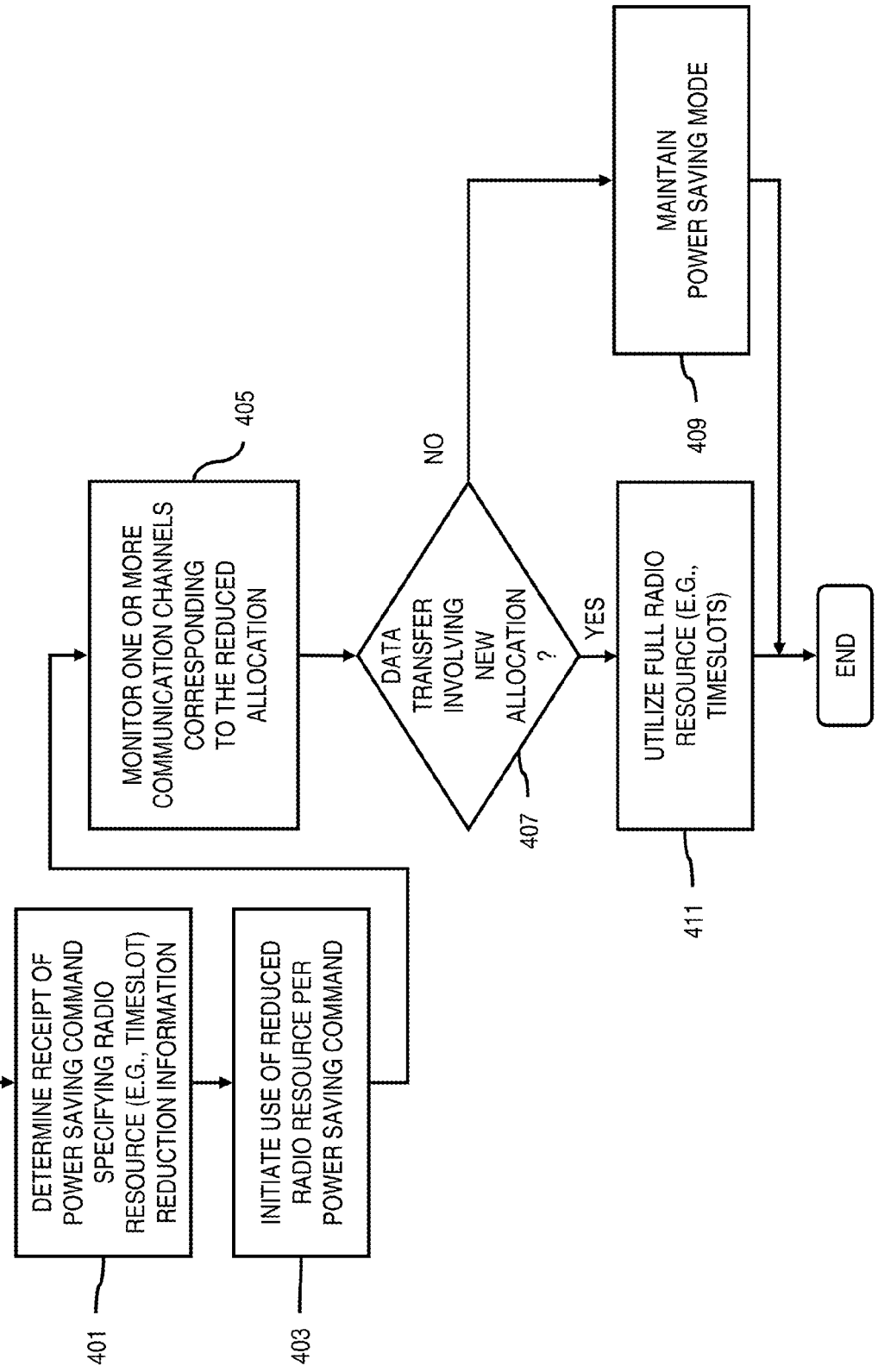
FIG. 4 is a flowchart of a process for reducing power consumption during a data transfer using a mobile station, according to an exemplary embodiment.

FIG. 4 is a flowchart of a process for reducing power consumption during a data transfer using a mobile station 101, according to an exemplary embodiment. Under this scenario, the MS 101 determines, as in step 401, the receipt of a control information from the base station 103 specifying radio resource reduction information (e.g., timeslot reduction information). In step 403, the MS 101 then initiates a power saving mode whereby it uses assigned radio resources (e.g., timeslots) according to the received control information containing the radio resource reduction information. In this manner, the MS 101 monitors one or more communication channels corresponding to the reduced allocation of the radio resources, per step 405. The power saving mode is maintained until the MS 101 detects a data transfer (involving a new resource allocation) either on the downlink or the MS 101 begins transferring data on the uplink (steps 407 and 409). Otherwise, the full radio resources are utilized, per step 411.

More specifically, on the downlink TBF for example, the MS 101 receives an RLC data block including the control information containing the radio resource reduction information appended to the last LLC PDU conveyed by the RLC data block. Based on the radio resource reduction information, the MS 101 monitors for the occurrence of downlink data blocks addressed to the MS 101 only on the resource (e.g., timeslot) indicated in the radio resource reduction information. The MS 101 resumes normal operations (i.e., use all assigned radio resources such as timeslots) when the MS 101 receives a new RLC data block that does not contain the radio resource reduction information.

For the uplink TBF, the MS 101 receives the corresponding control information containing the radio resource reduction information in the PUAN message. The MS 101 applies the reduced radio resource configuration upon, for instance, the reception of the PUAN message. The MS 101 resumes use of all assigned radio resources (e.g., timeslots) when the MS 101 transmits new data on the assigned TBF. Correspondingly, the transmission of the new data by the MS 101 triggers the base station 103 to resume to normal operation and possibly more frequent scheduling of the assigned radio resources.

Figure 5A:
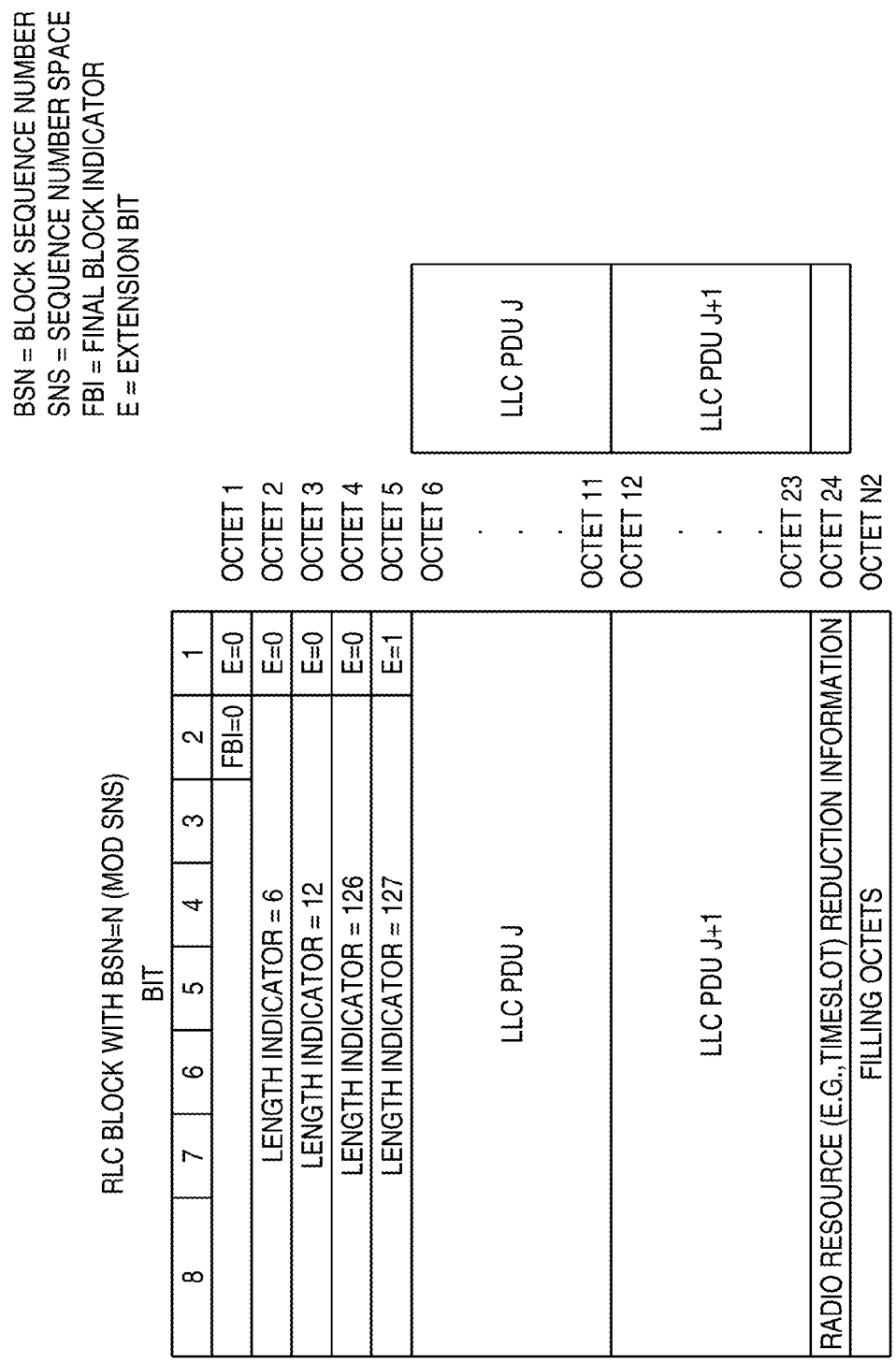
Figure 5C:
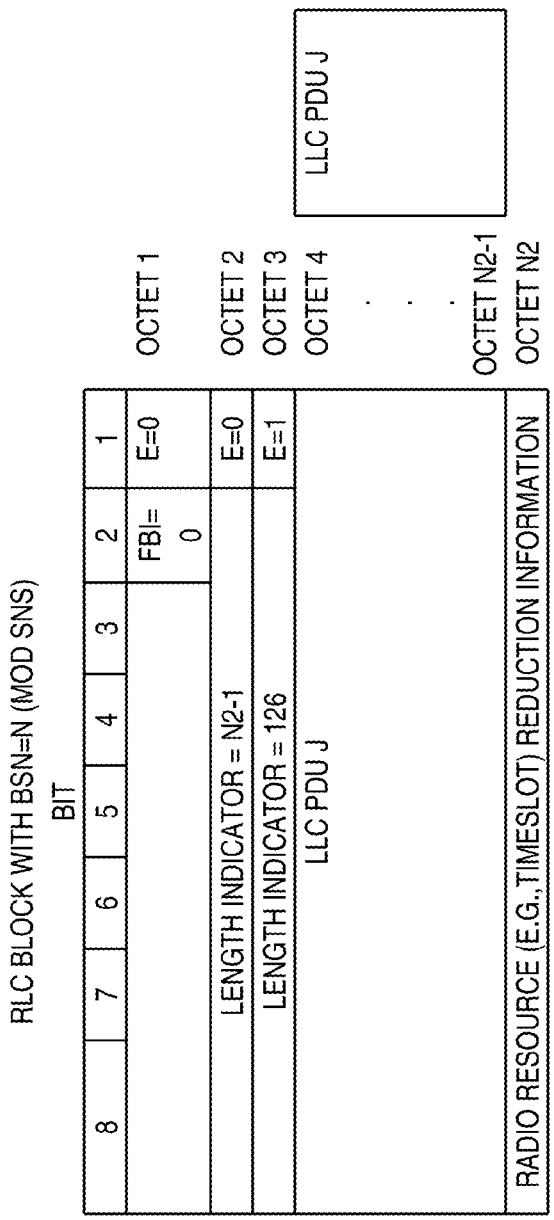

FIGS. 5A-5C are diagrams of radio link control (RLC) data blocks for signaling radio resource reduction information on a downlink TBF, according to various exemplary embodiments. As discussed previously, for the downlink TBF, the base station 103 signals reduced radio resource information to the base station 103 in the RLC data block appended after the last LLC PDU. Specifically, the radio resource reduction information (e.g., timeslot reduction information) is signaled as a bitmap (e.g., the "radio resource reduction bitmap"). The radio resource reduction bitmap is, for instance, either a 16-bit bitmap for a dual-carrier downlink or an 8-bit bitmap for a single-carrier downlink. In exemplary embodiments, the bitmap is a binary valued array representing the radio resource reduction information. Within the RLC data block, the presence of the radio resource reduction bitmap is indicated by a reserved length indicator value. The reserved length indicator values, for instance, are from 75 to 126.

FIG. 5A depicts a single radio resource (e.g., timeslot) reduction bitmap 501 with filling octets. The filling octets are filler data inserted to complete the data block. FIG. 5B depicts a two radio resource (e.g., timeslot) reduction bitmap 503 with filling octets used for a dual carrier configuration. Each radio resource reduction bitmap corresponds to one of the carriers. FIG. 5C depicts a single radio resource (e.g., timeslot) reduction bitmap 505 with no filling octets.

By way of example, on receiving the RLC data block containing the radio resource reduction information, the MS 101 starts monitoring the indicated reduced radio resource (e.g., reduced number of timeslots) when the received state variable (V(Q)) is equal to the block sequence number (BSN) of the RLC data block containing the radio resource reduction bitmap, and no RLC data blocks with higher BSN were received (V(R)) (i.e., V(Q)=V(R)). It is contemplated that when operating in RLC acknowledged mode (defined in §9.1.6.2 of 3GPP TS 44.060, incorporated herein by reference), the MS 101 behavior is deterministic in the sense that the RLC data block is always received.

When operating in RLC non-persistent mode (NPM) (defined in §9.1.6.4 of 3GPP TS 44.060, incorporated herein by reference), the RLC data block may be discarded before it is correctly received by the MS 101 due to the expiration of the NPM transfer time. However, the network can nonetheless control the radio resource reduction by transmitting the radio resource reduction bitmap in an RLC data block containing a dummy LLC PDU. Delayed downlink TBF release operates specifically by sending downlink dummy LLC PDUs to prevent the release of the TBF. It is also contemplated that the base station 103 may use any modulation or coding scheme to ensure that the MS 101 receives the RLC data block containing the radio resource reduction information.

As described previously, the MS 101 resumes data reception using all assigned radio resources (e.g., timeslots) upon receiving an RLC data block with header including a BSN higher (modulo the entire sequence number space) than the BSN of the last RLC data block which triggered the power saving mode and the RLC data block itself does not contain the radio resource reduction information.

With respect to the uplink, the base station 103 may signal the MS 101 that the base station 103 intends to reduce the scheduling of uplink radio resources for a given TBF when the mobile station 101 has exhausted its supply of uplink data. For example, the reduced uplink radio resources include a reduced number of timeslots on which the base station 103 transmits resource allocations (e.g., USF). In exemplary embodiments, it is contemplated that the base station 103 reduces the frequency of resource allocations (e.g., USF) to a value that it is sufficient for the MS 101 to monitor, for instance, just one assigned resource (e.g., timeslot) for the allocation. On receipt of the allocation and subsequent data transmission, the MS 101 may resume normal operation.

The signaling of the radio resource reduction information for the uplink TBF is included in a PUAN message as a release extension as shown in Table 1. In exemplary embodiments, the radio resource reduction typically includes a reduction on at least one carrier. When operating in dual carrier mode, the base station 103 may also include radio resource reduction information for the second carrier as well. If the radio resource reduction on the second carrier is not included, then the MS 101 shall not monitor the second carrier for uplink resource allocations (e.g., USF) until the MS 101 resumes normal operation. It is noted that in multiple TBF scenarios, there may be other TBF allocated on the second carrier. In that case, the MS 101 continues to monitor the second carrier even after the power saving mode is activated for the first TBF if an allocation of other TBF(s) requires the MS 101 to do so. Additionally, although exemplary embodiments are described with respect to a single TBF mode of operation, it is contemplated that the power saving approach described herein also applies to a multiple TBF mode of operation. It is further contemplated that the base station 103 may use any other message coding scheme to transmit the radio resource reduction information to the MS 101.

As previously discussed, the MS 101 applies the reduced radio resource configuration upon reception of the PUAN message containing the reduced radio resource information. The MS 101 then resumes data transfer using all assigned radio resources when the MS 101 transmits new data. Table 1, below, illustrates an exemplary PUAN message content.

TABLE 1

```
< Packet Uplink Ack/Nack message content > ::=
    < PAGE MODE : bit (2) >
    {   00 < UPLINK_TFI : bit (5) >
        { 0 -- Message escape
            {   < CHANNEL_CODING_COMMAND : bit (2) >
                < Ack/Nack Description : < Ack/Nack Description IE > >
                { 0 | 1    < CONTENTION_RESOLUTION_TLLI : bit (32) > }
                { 0 | 1    < Packet Timing Advance : < Packet Timing Advance
IE > > }
                { 0 | 1    < Power Control Parameters : < Power Control
Parameters IE > > }
                { 0 | 1    < Extension Bits : Extension Bits IE > }
        -- sub-clause 12.26
            0              -- The value '1' was allocated in an
```

TABLE 1-continued

```
earlier version of the protocol and shall not be used.
                {        null | 0 bit** = < no string > -- Receiver backward
compatible with earlier version
                | 1              --
Additions for R99
                { 0 | 1 <Packet Extended Timing Advance : bit (2) >}
                < TBF_EST : bit (1)>
                {    null | 0 bit** = <no string>  -- Receiver
backward compatible with earlier version
                | 1
    -- Additions for Rel-5
                    { 0 | 1 < CONTENTION_RESOLUTION
Identifier extension : bit (4) > }
                    { 0 | 1 < RB Id : bit (5) > }
                    < padding bits >
                }
            }
            ! < Non-distribution part error : bit (*) = < no string > >
        }
| 1                                          -- Message
escape bit used to define EGPRS message contents
{ 00
        {        < EGPRS Channel Coding Command : < EGPRS
Modulation and Coding Scheme IE >>
                < RESEGMENT : bit (1) >
                < PRE_EMPTIVE_TRANSMISSION : bit (1) >
                < PRR RETRANSMISSION REQUEST : bit (1) >
                < ARAC RETRANSMISSION REQUEST : bit (1) >
                { 0 | 1   < CONTENTION_RESOLUTION_TLLI : bit
(32) > }
                < TBF_EST : bit (1) >
                { 0 | 1   < Packet Timing Advance : < Packet Timing
Advance IE > > }
                { 0 | 1   < Packet Extended Timing Advance : bit (2) > }
                { 0 | 1   < Power Control Parameters : < Power Control
Parameters IE > > }
                { 0 | 1   <Extension Bits : Extension Bits IE > }
        -- sub-clause 12.26
                {        < EGPRS Ack/Nack Description : < EGPRS
Ack/Nack Description IE > >
                0            -- The value '1' was allocated in
an earlier version of the protocol and shall not be used.
                } //
                {        null | 0 bit** = <no string>      -- Receiver
backward compatible with earlier version
                | 1
    -- Additions for Rel-5
                    { 0 | 1 < CONTENTION_RESOLUTION
Identifier extension : bit (4) > }
                    { 0 | 1 < RB Id : bit (5) > }
                    {        null | 0 bit** = < no string >     --
Receiver backward compatible with earlier version
                    | 1
                        { 0 | 1
                            <
TIMESLOT_REDUCTION_C1 : bit (8) >
                                    { 0 | 1 <
TIMESLOT_REDUCTION_C2 : bit (8) > } }
                        < padding bits > } }
                    ! < Non-distribution part error: bit (*) = <no string> > }
        ! < Message escape: { 01 | 10 | 11 } bit (*) = <no string> > } }
    -- Extended for future changes
        ! < Address information part error : bit (*) = <no string> > }
    ! < Distribution part error : bit (*) = <no string> > ;
```

The process for reducing power consumption during a data transfer can be performed over a variety of networks; an exemplary system is described with respect to FIGS. 6A-6D.

Figure 6A:
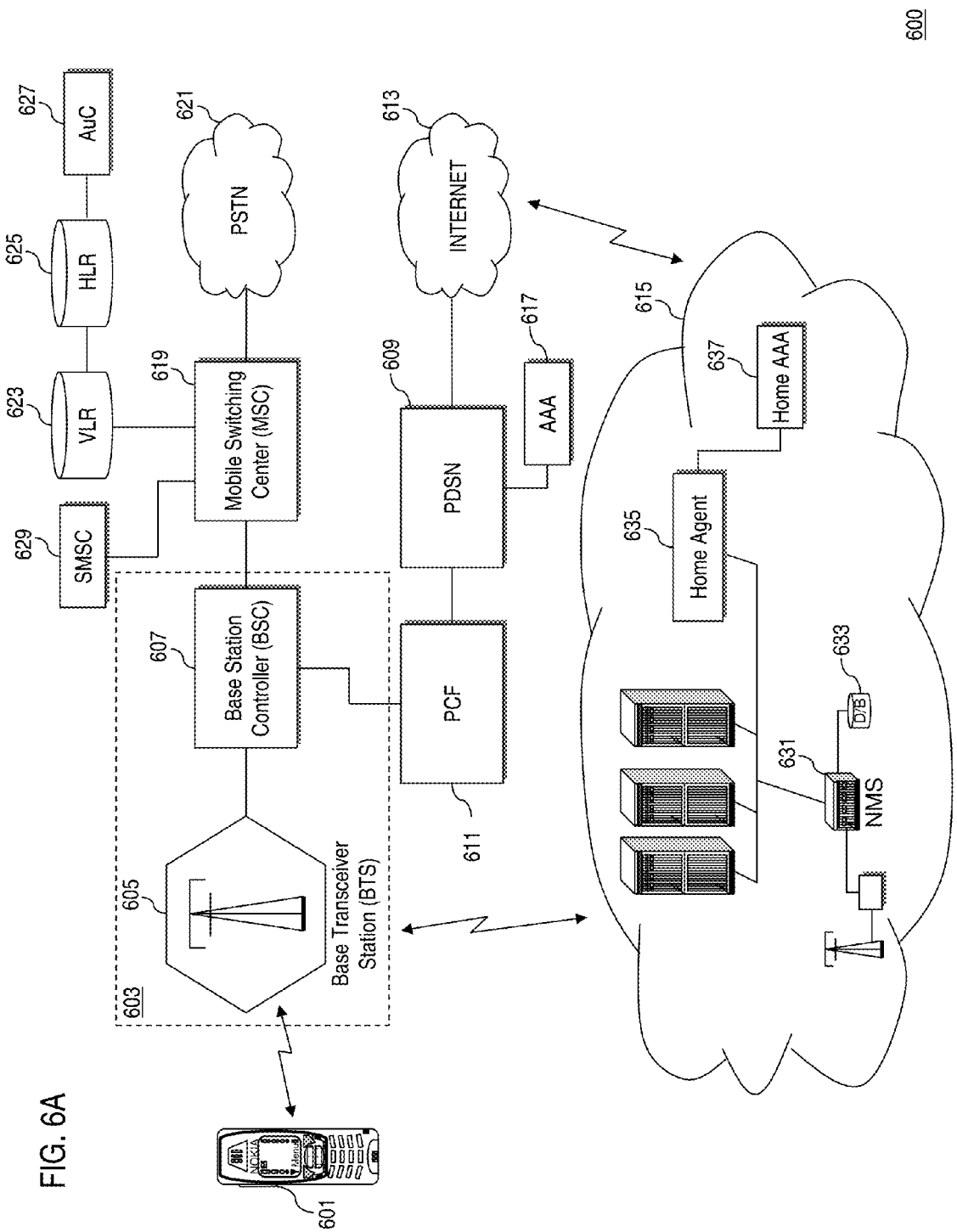
FIGS. 6A and 6B are diagrams of different cellular mobile phone systems in which the mobile stations and the base station of FIG. 1 can operate, according to various exemplary embodiments.
Figure 6B:
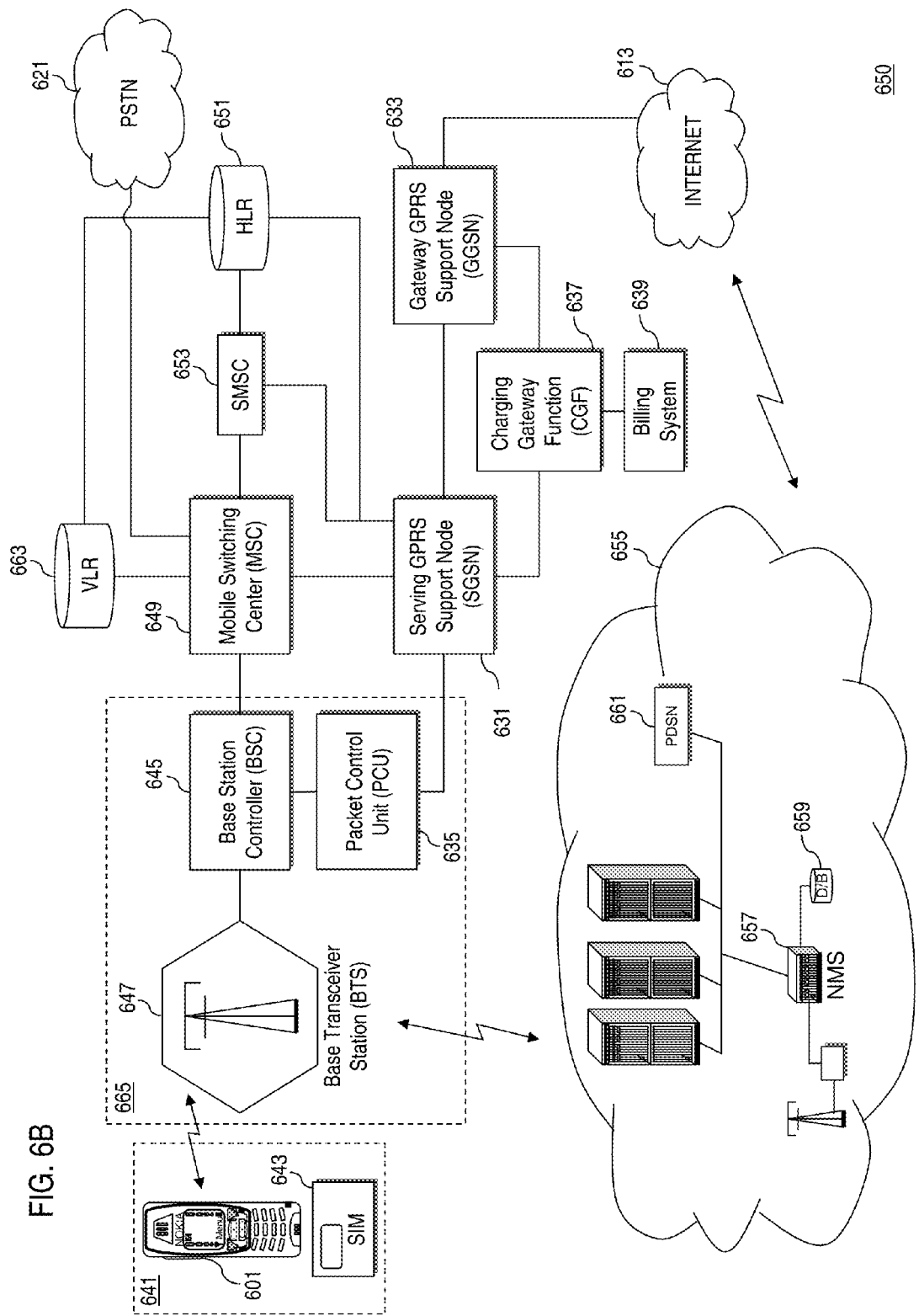

FIGS. 6A and 6B are diagrams of different cellular mobile phone systems in which the mobile stations and the base station of FIG. 1 can operate, according to various exemplary embodiments. FIGS. 6A and 6B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 600 includes mobile stations 601 (e.g., handsets, terminals, stations, units, devices, or any type of interface to the user (such as "wearable" circuitry, etc.)) in communication with a Base Station Subsystem (BSS) 603.

According to one embodiment of the invention, the radio network supports Third Generation (3G) services as defined by the International Telecommunications Union (ITU) for International Mobile Telecommunications 2000 (IMT-2000).

In this example, the BSS 603 includes a Base Transceiver Station (BTS) 605 and Base Station Controller (BSC) 607. Although a single BTS is shown, it is recognized that multiple BTSs are typically connected to the BSC through, for example, point-to-point links. Each BSS 603 is linked to a Packet Data Serving Node (PDSN) 609 through a transmission control entity, or a Packet Control Function (PCF) 611. Since the PDSN 609 serves as a gateway to external networks, e.g., the Internet 613 or other private consumer networks 615, the PDSN 609 can include an Access, Authorization and Accounting system (AAA) 617 to securely determine the identity and privileges of a user and to track each user's activities. The network 615 comprises a Network Management System (NMS) 631 linked to one or more databases 633 that are accessed through a Home Agent (HA) 635 secured by a Home AAA 637.

Although a single BSS 603 is shown, it is recognized that multiple BSSs 603 are typically connected to a Mobile Switching Center (MSC) 619. The MSC 619 provides connectivity to a circuit-switched telephone network, such as the Public Switched Telephone Network (PSTN) 621. Similarly, it is also recognized that the MSC 619 may be connected to other MSCs 619 on the same network 600 and/or to other radio networks. The MSC 619 is generally collocated with a Visitor Location Register (VLR) 623 database that holds temporary information about active subscribers to that MSC 619. The data within the VLR 623 database is to a large extent a copy of the Home Location Register (HLR) 625 database, which stores detailed subscriber service subscription information. In some implementations, the HLR 625 and VLR 623 are the same physical database; however, the HLR 625 can be located at a remote location accessed through, for example, a Signaling System Number 7 (SS7) network. An Authentication Center (AuC) 627 containing subscriber-specific authentication data, such as a secret authentication key, is associated with the HLR 625 for authenticating users. Furthermore, the MSC 619 is connected to a Short Message Service Center (SMSC) 629 that stores and forwards short messages to and from the radio network 600.

During typical operation of the cellular telephone system, BTSs 605 receive and demodulate sets of reverse-link signals from sets of mobile units 601 conducting telephone calls or other communications. Each reverse-link signal received by a given BTS 605 is processed within that station. The resulting data is forwarded to the BSC 607. The BSC 607 provides call resource allocation and mobility management functionality including the orchestration of soft handoffs between BTSs 605. The BSC 607 also routes the received data to the MSC 619, which in turn provides additional routing and/or switching for interface with the PSTN 621. The MSC 619 is also responsible for call setup, call termination, management of inter-MSC handover and supplementary services, and collecting, charging and accounting information. Similarly, the radio network 600 sends forward-link messages. The PSTN 621 interfaces with the MSC 619. The MSC 619 additionally interfaces with the BSC 607, which in turn communicates with the BTSs 605, which modulate and transmit sets of forward-link signals to the sets of mobile units 601.

As shown in FIG. 6B, the two key elements of the General Packet Radio Service (GPRS) infrastructure 650 are the Serving GPRS Supporting Node (SGSN) 631 and the Gateway GPRS Support Node (GGSN) 633. In addition, the GPRS infrastructure includes a Packet Control Unit (PCU) 635 and a Charging Gateway Function (CGF) 637 linked to a Billing System 639. Furthermore, in GPRS the Mobile Station (MS) 641 is composed of two parts—the mobile station 601 itself and the Subscriber Identity Module (SIM) 643—which is a small card within the station 601 containing an integrated circuit.

The BSS 665 includes a BTS 647, BSC 645, and a PCU 635. The PCU 635 is a logical network element responsible for GPRS-related functions such as air interface access control, packet scheduling on the air interface, and packet assembly and re-assembly. Generally the PCU 635 is physically integrated with the BSC 645; however, it can be collocated with a BTS 647 or a SGSN 631. The SGSN 631 provides equivalent functions as the MSC 649 including mobility management, security, and access control functions but in the packet-switched domain. Furthermore, the SGSN 631 has connectivity with the PCU 635 through, for example, a Frame Relay-based interface using the BSS GPRS protocol (BSSGP). Although only one SGSN is shown, it is recognized that that multiple SGSNs 631 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 645, any given BSC 645 generally interfaces with one SGSN 631. Also, the SGSN 631 is optionally connected with the HLR 651 through an SS7-based interface using GPRS enhanced Mobile Application Part (MAP) or with the MSC 649 through an SS7-based interface using Signaling Connection Control Part (SCCP). The SGSN/HLR interface allows the SGSN 631 to provide location updates to the HLR 651 and to retrieve GPRS-related subscription information within the SGSN service area. The SGSN/MSC interface enables coordination between circuit-switched services and packet data services such as paging a subscriber for a voice call. Finally, the SGSN 631 interfaces with a SMSC 653 to enable short messaging functionality over the network 650. The MSC 649 is generally collocated with a Visitor Location Register (VLR) 663 database that holds temporary information about active subscribers to that MSC 649. The data within the VLR 663 database is to a large extent a copy of the Home Location Register (HLR) 651 database, which stores detailed subscriber service subscription information. In some implementations, the HLR 651 and VLR 663 are the same physical database; however, the HLR 651 can be located at a remote location accessed through, for example, a SS7 network.

The GGSN 633 is the gateway to external packet data networks, such as the Internet 613 or other private customer networks 655. The network 655 comprises a Network Management System (NMS) 657 linked to one or more databases 659 accessed through a PDSN 661. The GGSN 633 assigns Internet Protocol (IP) addresses and can also authenticate users acting as a Remote Authentication Dial-In User Service host. Firewalls located at the GGSN 633 also perform a firewall function to restrict unauthorized traffic. Although only one GGSN 633 is shown, it is recognized that a given SGSN 631 may interface with one or more GGSNs 633 to allow user data to be tunneled between the two entities as well as to and from the network 650. When external data networks initialize sessions over the GPRS network 650, the GGSN 633 queries the HLR 651 for the SGSN 631 currently serving a MS 641.

The BTS 647 and BSC 645 manage the radio interface, including controlling which Mobile Station (MS) 641 has access to the radio channel at what time. These elements essentially relay messages between the MS 641 and SGSN 631. The SGSN 631 manages communications with an MS 641, sending and receiving data and keeping track of its location. The SGSN 631 also registers the MS 641, authenticates the MS 641, and encrypts data sent to the MS 641.

One of ordinary skill in the art would recognize that the processes for reducing power consumption during a data transfer may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 7:
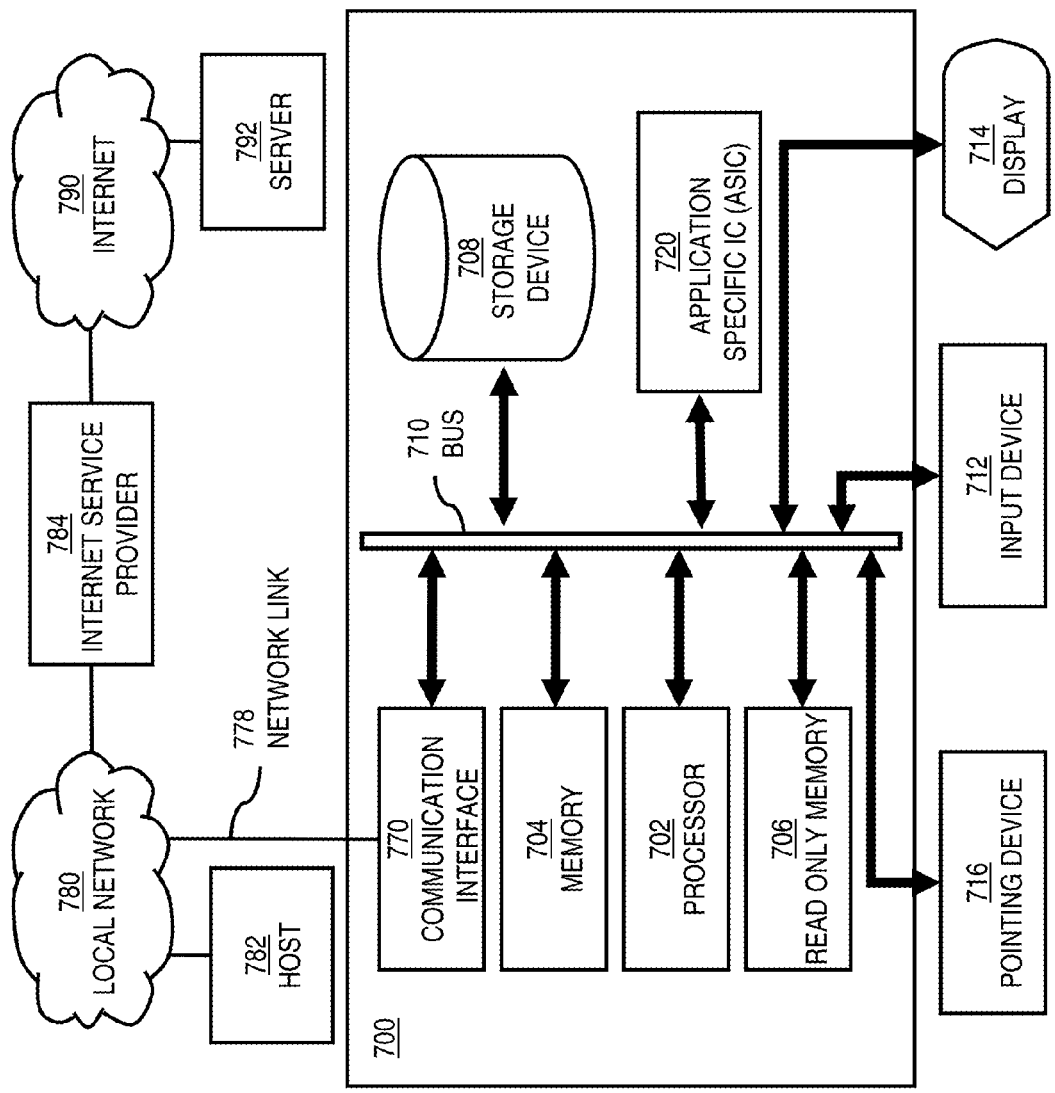
FIG. 7 is a diagram of hardware that can be used to implement an embodiment of the invention.

FIG. 7 illustrates a computer system 700 upon which an embodiment of the invention may be implemented. Computer system 700 is programmed to carry out the inventive functions described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected, e.g., a host computer 782, an internet service provider 784 connected to the Internet 790, and a server 792. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 8:
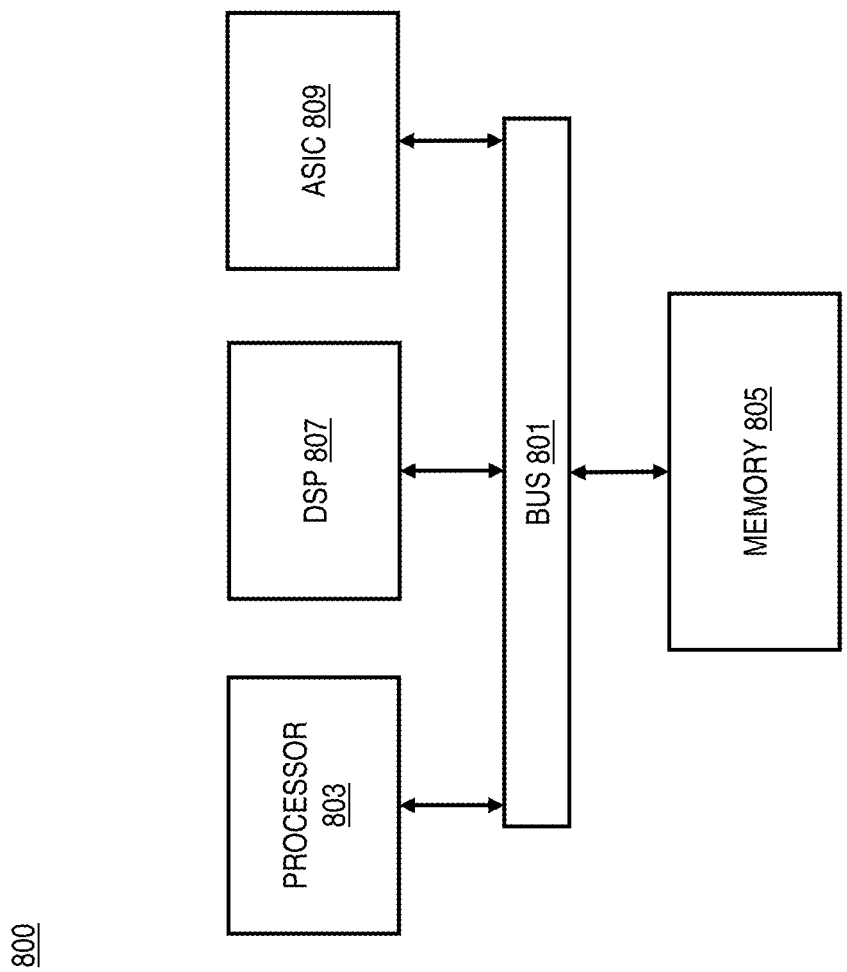
FIG. 8 is a diagram of a chip set that can be used to implement an embodiment of the invention.

FIG. 8 illustrates a chip set 800 upon which an embodiment of the invention may be implemented. Chip set 800 is programmed to carry out the inventive functions described herein and includes, for instance, the processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein. The memory 805 also stores the data associated with or generated by the execution of the inventive steps.

Figure 9:
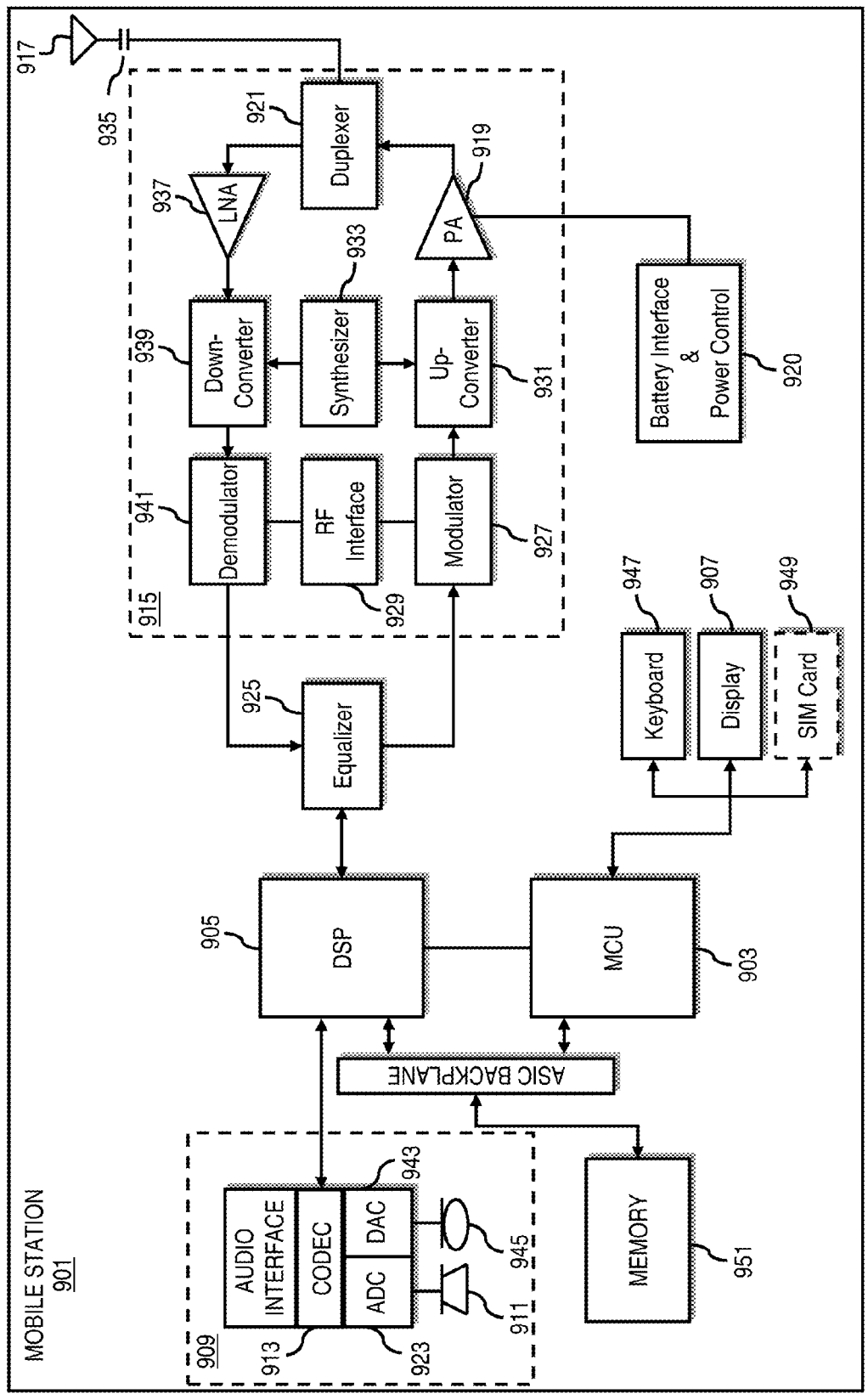
FIG. 9 is a diagram of a mobile station (e.g., handset) that can be used to implement an embodiment of the invention.

FIG. 9 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The MCU 903 delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    detecting a period of delayed release of one or more radio resources associated with a temporary block flow that is established to support a data transfer with a mobile station,
        wherein the one or more radio resources include one or more transmission timeslots in an uplink and/or a downlink;
    determining, utilizing a processor, an original amount of transmission timeslots in radio resources assigned to the mobile station at the beginning of the period of delayed release;
    generating, in response to the detection, radio resource reduction information associated with the temporary block flow,
        wherein the radio resource reduction information specifies a reduced allocation, below the determined original amount, of transmission timeslots in the radio resources;
    generating control information for transmission to the mobile station,
        wherein the control information includes the reduced allocation of transmission timeslots; and
    initiating transmission of the generated control information to the mobile station,
        wherein the transmitted control information specifies the reduced allocation of transmission timeslots in the uplink and/or the downlink while maintaining the uplink, the downlink, or a combination thereof.

2. A method according to claim 1,
    wherein the control information is associated with the downlink signaled in a radio link control (RLC) data block or associated with the uplink or the downlink signaled in a control message.

3. A method according to claim 1, wherein the control information is specified either as a bitmap, wherein each bit in the bitmap corresponds to a radio resource; or as one or more indices,
    wherein each index corresponds to a radio resource including a transmission timeslot in the uplink or the downlink.

4. A method according to claim 1, further comprising:
    determining whether there is a data transfer to or from the mobile station, wherein the radio resource reduction information is generated based on the determination.

5. A method according to claim 4, further comprising:
    if there is the data transfer, generating a second control information indicating resumption of full allocation of the one or more radio resources; and
    initiating transmission of the second control information to the mobile station.

6. A method according to claim 1, wherein the reduced allocation of the one or more radio resources is relative to an original allocation and is performed dynamically during a data gap corresponding to the data transfer.

7. A non-transitory computer-readable storage medium carrying one or more sequences of one or more instructions which, when executed by one or more processors, cause an apparatus to perform method of claim 1.

8. An apparatus comprising:
at least one processor; and
at least one memory including computer program code,
the at least one memory and the computer program code configured to, with the at least one processor, cause the apparatus to perform at least the following,
detect a period of delayed release of one or more radio resources associated with a temporary block flow that is established to support a data transfer with a mobile station,
wherein the one or more radio resources include one or more transmission timeslots in an uplink and/or a downlink,
determine an original amount of transmission timeslots in radio resources assigned to the mobile station at the beginning of the period of delayed release,
generate, in response to the detection, radio resource reduction information associated with the temporary block flow,
wherein the radio resource reduction information specifies a reduced allocation, below the determined original amount, of transmission timeslots in the radio resources,
generate control information for transmission to the mobile station,
wherein the control information includes the reduced allocation of transmission timeslots, and
initiate transmission of the generated control information to the mobile station,
wherein the transmitted control information specifies the reduced allocation of transmission timeslots in the uplink and/or the downlink while maintaining the uplink, the downlink, or a combination thereof.

9. An apparatus according to claim 8,
wherein the control information is associated with the downlink signaled in a radio link control (RLC) data block or associated with the uplink or the downlink signaled in a control message.

10. An apparatus according to claim 8, wherein the control information is specified either as a bitmap, wherein each bit in the bitmap corresponds to a radio resource; or as one or more indices, wherein each index corresponds to a radio resource including a transmission timeslot in the uplink or the downlink.

11. An apparatus according to claim 8, wherein the apparatus is further caused, at least in part, to:
determine whether there is a data transfer to or from the mobile station, wherein the radio resource reduction information is generated based on the determination.

12. An apparatus according to claim 11, wherein the apparatus is further caused, at least in part, to:
if there is the data transfer, generate second control information indicating resumption of full allocation of the one or more radio resources; and
initiate transmission of the second control information to the mobile station.

13. An apparatus according to claim 8, wherein the reduced allocation of the one or more radio resources is relative to an original allocation and is performed dynamically during a data gap corresponding to the data transfer.

14. A method comprising:
receiving a power saving command, at a mobile station, specifying control information including a reduced allocation of transmission timeslots in an uplink and/or a downlink while maintaining the uplink, the downlink, or a combination thereof associated with a temporary block flow that is established to support a data transfer with a base station; and
monitoring, utilizing a processor, one or more communication channels corresponding to the reduced allocation of the transmission timeslots for use in transfer of data during a period of delayed release of one or more radio resources associated with the temporary block flow,
wherein the control information specifies a reduced allocation below an original amount of transmission timeslots in radio resources assigned to the mobile station at the beginning of a period of delayed release of radio resources associated with the temporary block flow.

15. A method of claim 14, further comprising:
receiving, from a base station, control information indicating resumption of full allocation of the one or more radio resources.

16. An apparatus comprising:
at least one processor; and
at least one memory including computer program code,
the at least one memory and the computer program code configured to, with the at least one processor, cause the apparatus to perform at least the following,
receive a power saving command specifying control information including a reduced allocation of transmission timeslots in an uplink and/or a downlink while maintaining the uplink, the downlink, or a combination thereof associated with a temporary block flow that is established to support a data transfer with a base station, and
monitor one or more communication channels corresponding to the reduced allocation of the transmission timeslots for use in transfer of data during a period of delayed release of one or more radio resources associated with the temporary block flow,
wherein the control information specifies a reduced allocation below an original amount of transmission timeslots in radio resources assigned to the mobile station at the beginning of a period of delayed release of radio resources associated with the temporary block flow.

17. An apparatus of claim 16, wherein the apparatus is further caused, at least in part, to:
receive, from a base station, control information indicating resumption of full allocation of the one or more radio resources.

* * * * *